Oct. 12, 1954

C. E. STEINKE 2,691,244

DUMP TRUCK

Filed April 27, 1951

INVENTOR
CLAYTON E. STEINKE

BY *(signature)*

ATTORNEY

Oct. 12, 1954     C. E. STEINKE     2,691,244
DUMP TRUCK
Filed April 27, 1951     2 Sheets-Sheet 2
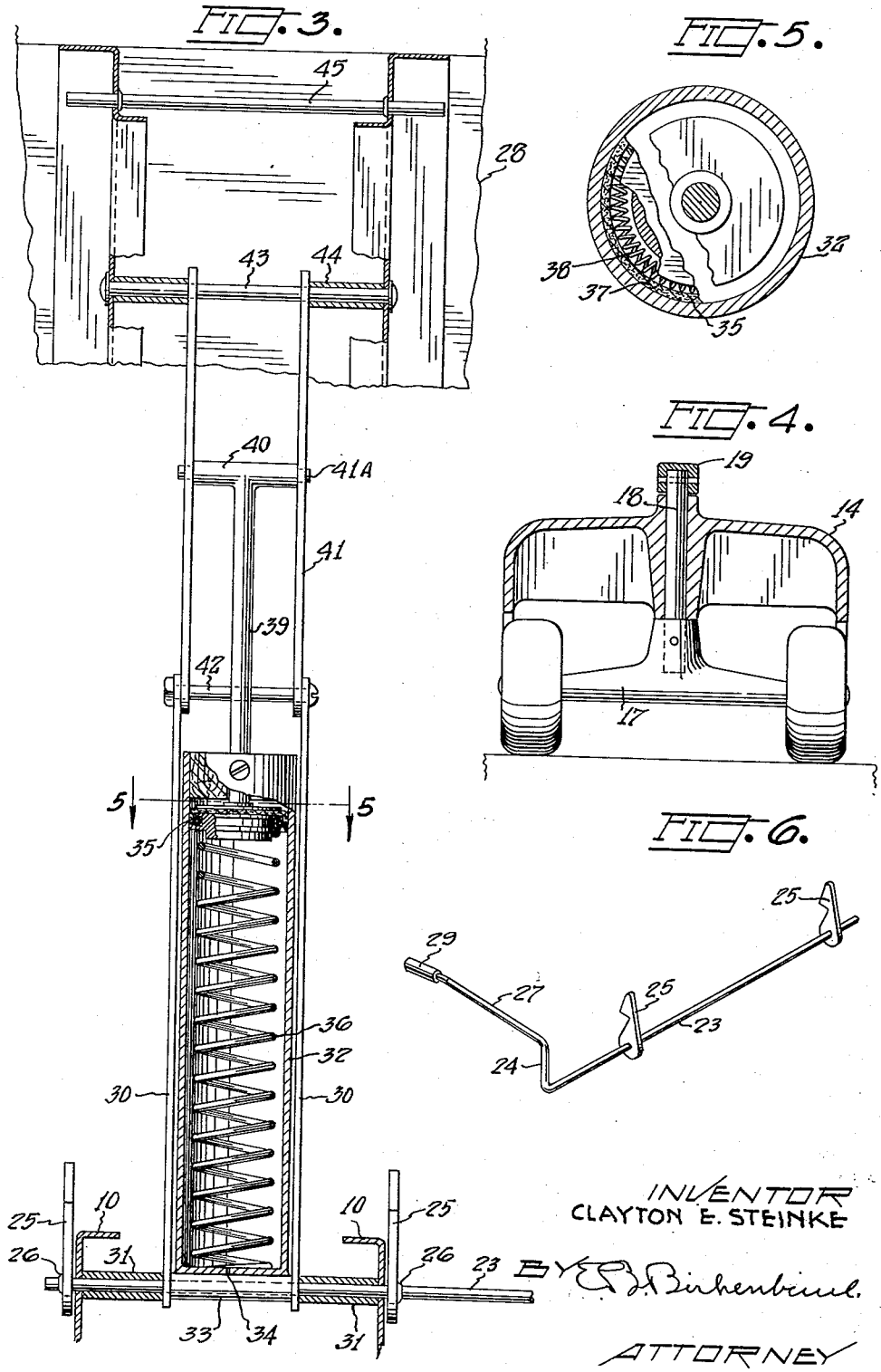
INVENTOR
CLAYTON E. STEINKE
ATTORNEY

Patented Oct. 12, 1954

2,691,244

UNITED STATES PATENT OFFICE 2,691,244

DUMP TRUCK

Clayton E. Steinke, Salem, Oreg.

Application April 27, 1951, Serial No. 223,225

4 Claims. (Cl. 46—214)

This invention relates generally to toys and particularly to a dump truck.

The main object of this invention is to produce a toy dump truck which will be extremely rugged in construction and which will simulate the actions of a full-size truck.

The second object is to provide a simple form of steering mechanism for use on such trucks.

The third object is to control the action of the dumping cylinder.

I accomplish these and other objects in the manner set forth in the following specifications as illustrated in the accompanying drawings, in which Fig. 1 is a perspective view of the truck in a travelling position.

Fig. 3 is a vertical section taken along the line 3—3 in Fig. 2.

Fig. 4 is a vertical section taken along the line 4—4 in Fig. 2.

Fig. 5 is a transverse section taken along the line 5—5 in Fig. 3.

Fig. 6 is a perspective view of the operating lever.

Like numbers of reference refer to the same or similar parts throughout the several views.

Figure 2:
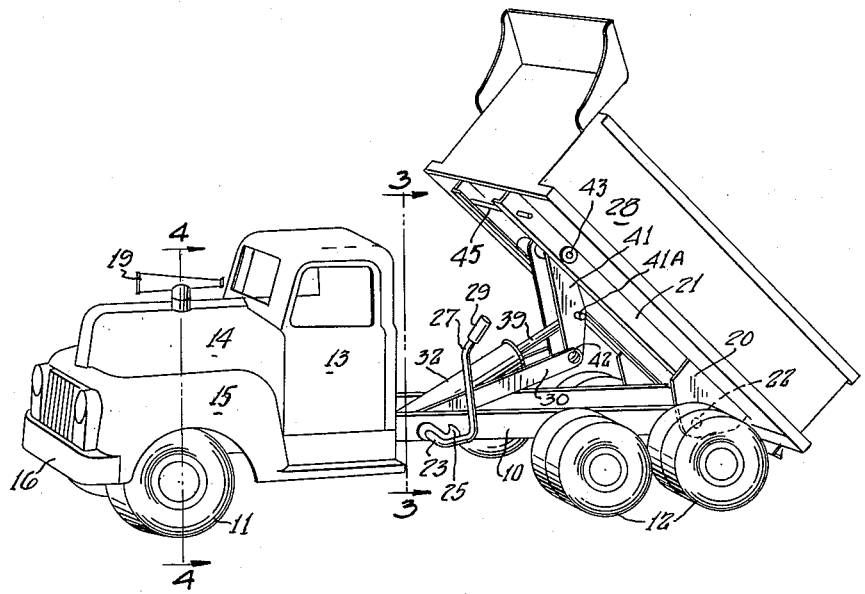
Fig. 2 is a view similar to Fig. 1 but showing the parts in a dumping position.

Referring in detail to the drawings, there is shown a truck chassis including a frame 10 and the supporting front wheels 11 and rear wheels 12. The usual cab 13, the hood 14, front fenders 15 and front bumper 16 are indicated.

The front axle 17 is mounted under a central spindle 18 on whose upper end is secured a T handle 19 by means of which the front wheels 11 can be steered.

To the rear end of the frame 10 are hinged the vertical plates 20 which are attached to the beams 21. The plates 20 are pivotally attached to the frame 10 by the bolts 22. Passing through the frame members 10 is a shaft 23 whose portion 24 is substantially normal to the shaft 23 and on which shaft are secured the hooks 25 by means of the welds 26. The portion 27 is bent to permit its engagement with the under side of the body 28.

A handle 29 is formed on the end of the member 27. It can be seen that an upward movement of the handle 29 will start a dumping movement by the body 28.

In Fig. 3 is shown a pair of side links 30 which are pivotally connected at their lower ends to the shaft 23 and held between the frames 10 by the spacers 31. Between the links 30 is disposed a vented air cylinder 32 whose T head 33 is mounted on the shaft 23. The head 33 has an air port 34 which is small enough to retard the action of the piston 35 under the influence of a load or the action of the spring 36. The piston 35 is provided with a flexible cup 37 which is urged outwardly into contact with the cylinder 32 by a spring 38 or in any other convenient manner.

To the piston 35 is attached a rod 39 whose T head 40 is connected to the dump levers 41 by means of the pin 41-A and the lower ends of the levers 41 are connected by the bolt 42 to the side links 30. The upper end of the levers 41 are connected by the cross shaft 43 to the body beams 21 and spaced therefrom by the tubes 44.

Figure 1:
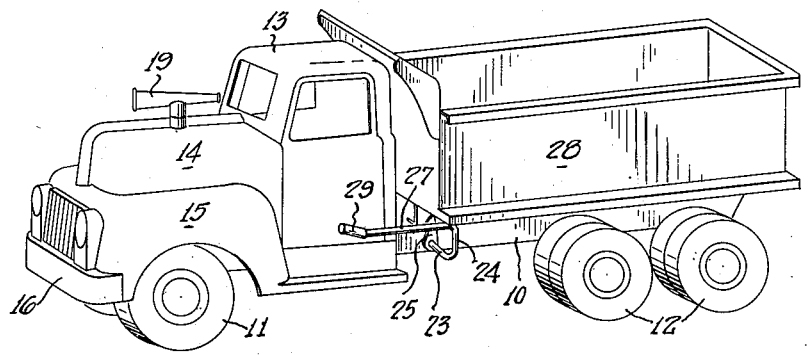

A cross bar 45 is fixed across the forward ends of the beams 21 to receive the hooks 25 when the handle 29 is moved to the position shown in Fig. 1.

It can be seen from the foregoing that in the operation of the truck the child is able to simulate the operation of a full-size truck in that he can maneuver the truck at will and can manually depress the empty body to the position shown in Fig. 1 where it is held by the hooks 25 and the load can be dumped.

The action of the lever 27 is to start the dumping action which is completed by the spring 36 under the control of the port 34.

I claim:

1. A toy truck having in combination a set of ground engaging wheels, a chassis frame supported by said wheels, a dump body having its rearmost end hinged to the rearmost end of said frame, a pair of dump levers having one end thereof hinged to a forward portion of said dump body, a pair of side links hinged to the opposite ends of said levers and to the chassis frame, said side links having a vented air cylinder therebetween and having a rod connecting said cylinder to an intermediate portion of said dump levers, a spring within said cylinder for urging said dump levers toward a vertical dumping position, a shaft mounted across said frame having an operating lever normally engaging the under side of said body when in a lowered position, a hook mounted on said shaft and a cross bar mounted under the forward end of said body adapted to engage said hook when said operating lever is lowered, said operating lever providing the initial portion of the dumping movement by engagement with the under side of said body.

2. A toy truck comprising a set of ground engaging wheels having a chassis frame mounted thereon and having a dump truck body hinged to the rearward end of said frame, a shaft journaling in said frame having a hand lever at one end thereof engaging the under side of the truck body when in a lowered position and tending to raise said body when said lever is moved upwardly, said shaft having a hook secured thereon, said truck body having a transverse bar attached thereto adapted to engage said hook when said body is lowered, a vented air cylinder hinged to said frame, two pairs of levers connected between said body and the hinge of said air cylinder, a rod in said air cylinder connected to the pair of levers adjacent to said body and a spring in said air cylinder between the end of said rod and the opposite end of said cylinder urging said body toward a dumping position.

3. In a toy of the class described, the combination of a chassis frame, a dump body having its rearward end hinged over the rearward end of said chassis frame, a transverse shaft journaling in said frame, a hook on said shaft, a bar on said body engageable with said hook when said body is lowered, a hand lever mounted on said shaft occupying a horizontal position under said body when lowered and exerting a lifting action on the forward end of said body when said body is raised, and a vented air cylinder having one end hinged on said shaft and having a piston rod therein, a spring in said cylinder urging said piston rod outwardly, a dump lever having its intermediate portion attached to the end of said piston rod, one end of said dump lever being connected to the forward end of said dump body and the other end of said dump lever being connected by a link to the shaft on which said cylinder is mounted.

4. A toy truck having ground engaging wheels and a chassis frame supported thereby, with a truck body having its rearmost end hinged to the rearward end of said chassis, said body having a pair of spaced dump levers hinged to the forward end thereof, a pair of side links hinged to the opposite ends of said dump levers, a shaft journaling transversely in said chassis frame, said shaft having a handle attached thereto, said handle normally occupying a horizontal position under the front end of said body, said shaft having a hook mounted thereon, a cross bar attached to said body engageable with said hook, a vented air cylinder hinged to the central portion of said shaft, said cylinder having a spring urged piston therein, said piston having a rod attached to the intermediate portion of the dump levers.

References Cited in the file of this patent

UNITED STATES PATENTS

| Number | Name | Date |
|---|---|---|
| 1,566,031 | Marks | Dec. 15, 1925 |
| 1,602,424 | Wood | Oct. 12, 1926 |